(12) United States Patent
Carver et al.

(10) Patent No.: US 11,728,058 B2
(45) Date of Patent: Aug. 15, 2023

(54) SYSTEMS AND METHODS FOR TRANSFERRING SPENT NUCLEAR FUEL FROM WET STORAGE TO DRY STORAGE

(71) Applicant: NAC International Inc., Norcross, GA (US)

(72) Inventors: George C. Carver, Norcross, GA (US); Juan C. Subiry, Atlanta, GA (US); John T. Donahoe, Alpharetta, GA (US); Vadim Z. Shtylman, Alpharetta, GA (US)

(73) Assignee: NAC INTERNATIONAL INC., Norcross, GA (US)

( * ) Notice: Subject to any disclaimer, the term of this patent is extended or adjusted under 35 U.S.C. 154(b) by 1247 days.

(21) Appl. No.: 16/021,856

(22) Filed: Jun. 28, 2018

(65) Prior Publication Data

US 2018/0308594 A1    Oct. 25, 2018

Related U.S. Application Data

(62) Division of application No. 14/504,533, filed on Oct. 2, 2014, now Pat. No. 10,032,533.

(Continued)

(51) Int. Cl.
*G21C 19/32* (2006.01)
*G21F 5/008* (2006.01)
(Continued)

(52) U.S. Cl.
CPC ............ *G21F 5/008* (2013.01); *G21C 19/32* (2013.01); *G21F 5/06* (2013.01); *G21F 5/14* (2013.01)

(58) Field of Classification Search
CPC ... G21F 5/008; G21F 5/06; G21F 5/14; G21C 19/32
See application file for complete search history.

(56) References Cited

U.S. PATENT DOCUMENTS 3,113,215 A     12/1963  Allen
3,638,561 A  *   2/1972  Price ..................... B30B 9/3096
                                                         100/215
(Continued)

FOREIGN PATENT DOCUMENTS

EP         0041162 A1 * 12/1981    ............... G21F 5/14
EP         0757361 A1    2/1997
(Continued)

OTHER PUBLICATIONS

Green, S. et al., Storage and Transport Cask Data For Used Commercial Nuclear Fuel, ATI-TR-13047, 2013, available at https://www.osti.gov/servlets/purl/1553317. (Year: 2013).*

(Continued)

*Primary Examiner* — Jack W Keith
*Assistant Examiner* — Joshua C Devorkin
(74) *Attorney, Agent, or Firm* — Thomas | Horstemeyer, LLP

(57) ABSTRACT

Systems and methods of transferring nuclear fuel from fuel pools having size and/or weight limitations to a storage or transport cask are disclosed. A canister containing spent nuclear fuel is inserted into a transfer cask. A shielding sleeve is then placed around the transfer cask. A lifting device simultaneously lifts the transfer cask and the shielding sleeve over a storage cask and the spent fuel is transferred from the transfer cask to the storage or transport cask.

18 Claims, 13 Drawing Sheets

Related U.S. Application Data

(60) Provisional application No. 61/885,580, filed on Oct. 2, 2013.

(51) Int. Cl.
*G21F 5/06* (2006.01)
*G21F 5/14* (2006.01)

(56) References Cited

U.S. PATENT DOCUMENTS

| | | | |
|---|---|---|---|
| 4,174,132 A * | 11/1979 | Crook, Jr. | B66C 1/34 |
| | | | 294/82.3 |
| 4,291,536 A | 9/1981 | Girard | |
| 4,326,130 A | 4/1982 | Ahner et al. | |
| 4,339,411 A | 7/1982 | Knackstedt et al. | |
| 4,368,268 A | 1/1983 | Gong | |
| 4,388,268 A | 6/1983 | Knackstedt et al. | |
| 4,434,373 A | 2/1984 | Christ et al. | |
| 4,521,691 A | 6/1985 | Christ et al. | |
| 4,535,250 A | 8/1985 | Fields | |
| 4,590,383 A | 5/1986 | Machado et al. | |
| 4,752,437 A | 6/1988 | Ito et al. | |
| 4,783,309 A | 11/1988 | Popp et al. | |
| 5,058,655 A | 10/1991 | Derp et al. | |
| 5,291,532 A | 3/1994 | Townsend | |
| 5,513,231 A | 4/1996 | Jones et al. | |
| 5,641,970 A | 6/1997 | Taniuchi et al. | |
| 5,644,608 A | 7/1997 | Malik et al. | |
| 5,646,971 A * | 7/1997 | Howe | G21C 19/06 |
| | | | 376/272 |
| 5,668,843 A | 9/1997 | Wasinger | |
| 5,887,042 A | 3/1999 | Akamatsu et al. | |
| 6,195,404 B1 | 2/2001 | Lemogne et al. | |
| 6,389,093 B1 | 5/2002 | Gluschke et al. | |
| 6,498,826 B2 | 12/2002 | Gluschke et al. | |
| 6,587,536 B1 | 7/2003 | Singh et al. | |
| 6,839,395 B2 | 1/2005 | Ohsono et al. | |
| 7,215,728 B2 | 5/2007 | Ohsono et al. | |
| 7,994,380 B2 | 8/2011 | Singh et al. | |
| 8,067,659 B2 | 11/2011 | Singh et al. | |
| 8,415,521 B2 | 4/2013 | Singh et al. | |
| 2001/0015989 A1 | 8/2001 | Gluschke et al. | |
| 2002/0152841 A1 | 10/2002 | Ohsono et al. | |
| 2003/0231732 A1 | 12/2003 | Weber et al. | |
| 2004/0109523 A1 * | 6/2004 | Singh | G21F 7/005 |
| | | | 376/272 |
| 2005/0117687 A1 | 6/2005 | Carver | |
| 2006/0188054 A1 * | 8/2006 | Pennington | G21F 5/12 |
| | | | 376/272 |
| 2008/0137794 A1 | 6/2008 | Tjersland | |
| 2008/0265182 A1 | 10/2008 | Singh et al. | |
| 2009/0175404 A1 | 7/2009 | Singh | |
| 2012/0061632 A1 | 3/2012 | Panio | |
| 2012/0142991 A1 | 6/2012 | Singh et al. | |
| 2012/0201340 A1 | 8/2012 | Pennington et al. | |

FOREIGN PATENT DOCUMENTS

| | | |
|---|---|---|
| EP | 0821367 A1 | 1/1998 |
| JP | 2001-264494 A | 9/2001 |
| JP | 2004-4038 A | 1/2004 |
| WO | 2014/117082 A1 | 7/2014 |

OTHER PUBLICATIONS

Japanese Office Action issued in Japanese Patent Office for Application No. 2016-546877 dated May 28, 2019.
Korean Final Office Action issued in co-pending, related Korean Application No. 10-2016-7010994 dated Apr. 28, 2021—English Translation provided.
Korean Office Action issued in co-pending, related Korean Application No. 9-5-2020-074386039 dated Oct. 26, 2020.
Rasmussen, "Comparison of Cask and Drywell Storage Concepts for a Monitored Retrievable Storage/Interim Storage System,", Dec. 1982, p. 5.57, 5.58, 6.26, [online] URL=, http://www.osti.gov/schitech/servlets/purl/6793917.
PCT Search Report and Written Opinion in co-pending, related PCT Application No. PCT/US14/58754, dated Feb. 10, 2015.
Extended European Search Report in co-pending, related European Application No. 10817736.1, dated May 26, 2014.
International Search Report and Written Opinion in related PCT Application No. PCT/US2010/048878, dated Nov. 2, 2010.
Japanese Office Action issued in Japanese Patent Office for Application No. 2016-546877 dated Jun. 5, 2018.

* cited by examiner

SYSTEMS AND METHODS FOR TRANSFERRING SPENT NUCLEAR FUEL FROM WET STORAGE TO DRY STORAGE

CROSS REFERENCE TO RELATED APPLICATIONS

This is a divisional application of U.S. application Ser. No. 14/504,533, filed Oct. 2, 2014 entitled "SYSTEMS AND METHODS FOR TRANSFERRING SPENT NUCLEAR FUEL FROM WET STORAGE TO DRY STORAGE", which application claims priority to U.S. Provisional Patent Application entitled "SLEEVE AND TRANSFER CASK SYSTEM AND METHODS" filed on Oct. 2, 2013 and assigned application No. 61/885,580, which is incorporated by reference herein in its entirety.

BACKGROUND

Spent nuclear fuel can be stored in reservoirs of water referred to as "a spent nuclear fuel pool." Spent nuclear fuel assemblies can be immersed or stored in the spent nuclear fuel pool until such time as appropriate thermal and/or radioactivity conditions have been met, at which the assemblies can be transferred into transport and/or dry storage systems for off-site storage. As a spent nuclear fuel pool reaches capacity, it can be desirable to remove spent nuclear fuel assemblies and transfer one or more assemblies to on-site or off-site storage. On-site or off-site storage of spent nuclear fuel can involve transferring the spent nuclear fuel assemblies using a transfer cask to a storage cask and/or transport cask that is hardened against accidents that may occur during storage or transport.

SUMMARY

Included are systems and methods for transferring and handling spent nuclear fuel during the transfer from wet to dry storage. One embodiment of a method, among others, is a method for transferring spent fuel from wet storage to dry storage, the method comprising loading a container of spent fuel into a cavity of a transfer cask; placing a shielding sleeve around the transfer cask; simultaneously lifting the transfer cask and the shielding sleeve over a storage cask; and transferring the container of spent fuel from the transfer cask to the storage cask.

Another embodiment of a system, among others, includes a transfer cask system for transferring spent nuclear fuel from wet storage to dry storage, the transfer cask system comprising a lifting device comprising a plurality of first lifting hooks and a plurality of second lifting hooks; a cylindrical container comprising a side wall, a top, and a bottom that define a cavity configured to support spent nuclear fuel, the plurality of second lifting hooks being engaged with a plurality of lifting members extending upwardly from the top of the cylindrical container; and a cylindrical sleeve disposed around an exterior of the cylindrical container, the cylindrical sleeve comprising a plurality of trunnion pins extending outwardly from an exterior of the cylindrical sleeve and being engaged with the plurality of first lifting hooks.

Another embodiment of a system, among others, includes a system for transferring spent fuel from wet storage to dry storage, the system comprising a transfer means for transferring spent nuclear fuel from wet storage to dry storage; a shielding means for shielding radiation generated from the spent nuclear fuel; and a lifting means for simultaneously lifting the transfer means and the radiation shielding means, the lifting means comprising a first attachment means for attaching to the transfer means and a second attachment means for attaching to the shielding means.

Other embodiments, systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
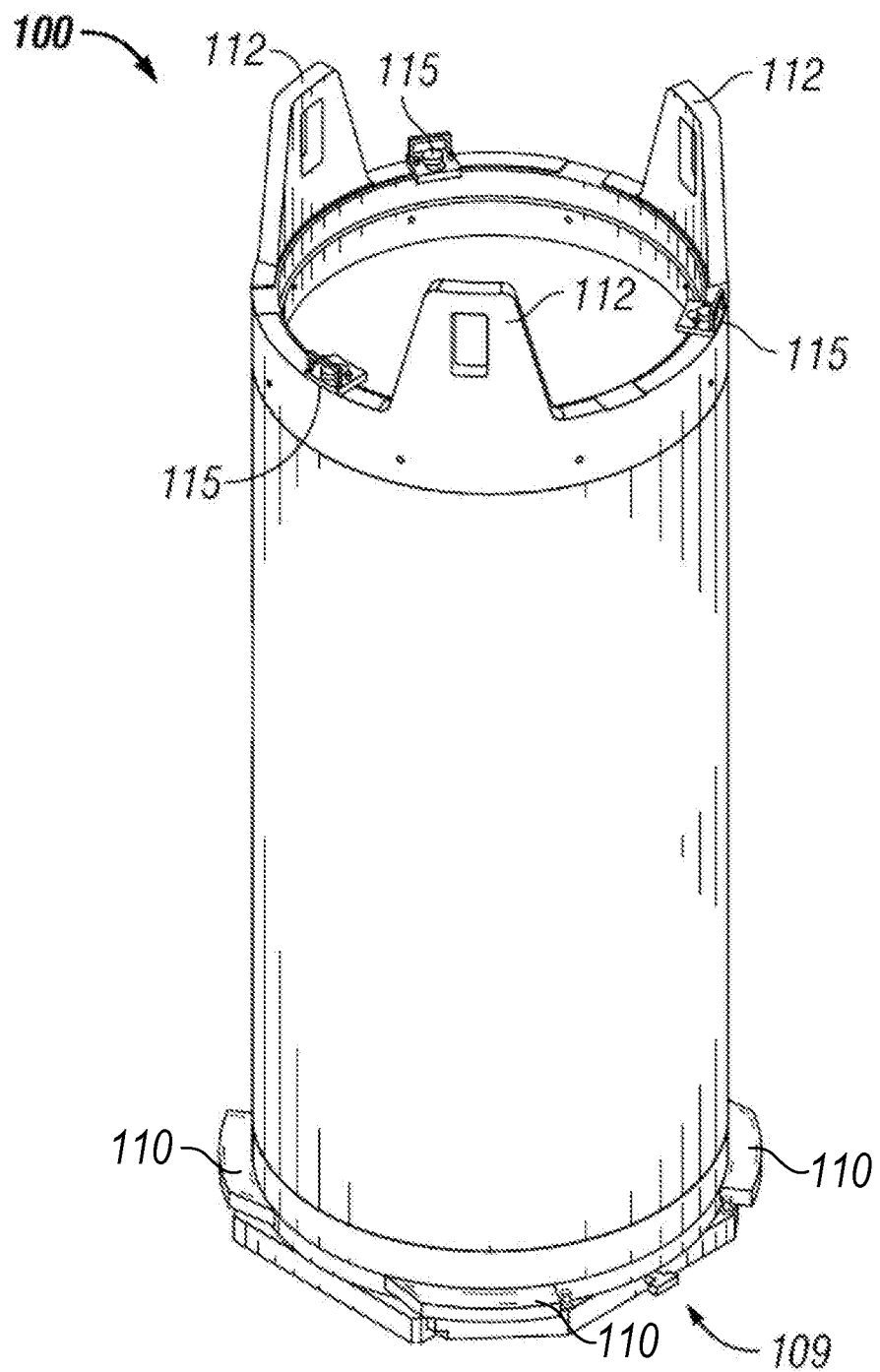
FIG. 1 is a drawing of an example of a transfer cask according to various embodiments of the present disclosure.

In the following discussion, a general description of systems and methods according to various embodiments of the present disclosure is provided, followed by a discussion of the operation of the same. Embodiments of the present disclosure relate to spent nuclear fuel transfer systems used to transfer spent nuclear fuel from wet storage to dry storage.

More specifically, disclosed herein are novel approaches to the implementation of transfer casks that allow for the removal and transfer of spent nuclear fuel from a fuel pool with limited space and/or weight restrictions to an appropriate dry storage system.

When an operating reactor is shut down for refueling, spent nuclear fuel is stored in a spent nuclear fuel pool to allow for the thermal and radioactivity levels of the spent nuclear fuel to decrease. As a spent nuclear fuel pool reaches capacity, the spent nuclear fuel stored in the spent nuclear fuel pool that have reached the appropriate thermal and/or radioactive levels for removal can be removed from the pool and transferred to a dry storage system so that additional spent nuclear fuel assemblies that are used by a reactor can be immersed in the spent nuclear fuel pool. The spent nuclear fuel may be assembled and stored in spent nuclear fuel assemblies, for example, but not limited to, the spent nuclear fuel assemblies provided in U.S. patent application Ser. No. 13/395,712, filed on Sep. 15, 2010 and entitled "System and Method for Integration of Wet and Dry Nuclear Fuel Storage," which is hereby incorporated by reference in its entirety.

A dry storage system may include concrete storage casks in which properly conditioned and sealed metal canisters that include the spent nuclear fuel are inserted. A storage cask or transport cask serves as an enclosure or overpack structure that provides mechanical protection, heat removal features, and radiation shielding for the inner metal canister that encloses the spent nuclear fuel. In most dry storage systems used with wet storage (e.g., immersion in a spent nuclear fuel pool), the spent nuclear fuel at the time of discharge from a reactor emanates high levels of heat and radiation due to radioactive decay, levels that are higher than dry storage systems can safely, efficiently, and economically store. Therefore, discharged spent nuclear fuel must spend some amount of time in the spent nuclear fuel pool until the radioactive decay and associated heat has reached levels sufficiently low enough so that dry storage technology can be used. This period of time for required storage in the spent nuclear fuel pool can be 3 to 10 years or more depending on the cask system licensed configuration.

When spent nuclear fuel is suitable for dry storage, a transfer cask may be employed to transfer the spent nuclear fuel from the nuclear fuel pool to the transport and/or storage cask associated with a dry storage system. During the transfer process, the transfer cask may be submerged in a transfer area of the nuclear fuel pool. The transfer cask is configured to accept a spent nuclear fuel canister having the spent nuclear fuel disposed therein. The transfer cask may be lifted from the nuclear fuel pool and placed in a work area with platforms in or out of the spent fuel area to allow for proper conditioning of the canister for dry storage. For example, final closure lids of the canister may be welded closed or sealed with mechanical methods at the power plants. Once the spent nuclear fuel canister is properly conditioned and sealed, the transfer cask may be used to transfer the canister to a transport and/or storage cask associated with a dry storage system.

Although the thermal and radioactive levels of the spent nuclear fuel may be sufficiently low enough to employ dry storage technology, the levels may increase without proper cooling and shielding features during the transfer process since the spent nuclear fuel canister is no longer in the spent nuclear fuel pool. To avoid an unallowable increase of thermal and/or radioactive levels during the removal of the spent nuclear fuel from the spent nuclear fuel pool, the spent nuclear fuel is required to be cooled and shielded.

Some wet storage facilities can have limited space and/or weight restrictions in the spent fuel pool and/or the laydown areas within the facility. A laydown area may include the floor outside the spent fuel pool or a platform in the fuel pool, building, or other area where the transfer cask is placed for handling and processing activities. Accordingly, prior art transfer casks can exceed the sizing and/or weight capabilities within such facilities. To accommodate for proper shielding of the heat and radiation emitted from the spent nuclear fuel during the transfer process, prior art transfer casks comprise multiple layers of shielding material which can increase both the weight and the width of the transfer cask. Accordingly, the diameter of prior art transfer casks that provide proper shielding may exceed the size limits of some fuel pool areas in which the transfer cask is to be immersed for receiving the spent nuclear fuel. Accordingly, the transfer cask size may not fit in the area for receiving the spent nuclear fuel due to the limited space in the fuel pool area.

Another limitation in some wet storage facilities may include the weight capacity of the fuel pool floor and/or any other laydown area within the facility where the cask may be placed for handling and processing activities. The multiple shielding layers that provide proper shielding in the prior art transfer casks can increase the weight of the transfer cask. The prior art transfer casks that would be within the weight capabilities of such facilities may not have sufficient shielding and, therefore, the risk to radiation exposure is increased as the transfer cask is removed from the fuel pool.

Some prior art transfer casks address the weight limitations by replacing one or more layers of shielding materials with a jacket of liquid shielding material (e.g., water) that can be drained to temporarily address weight limitations. However, such prior art transfer casks do not address both the size and weight limitations interchangeably or simultaneously for all phases of the transfer operation. Furthermore, prior art lightweight transfer casks require supplemental shielding outside of the spent fuel pool once the cask is set down in the preparation area. However, prior art shielding is not installed during the cask movement, and is added once the cask is set down out of the fuel pool. Accordingly, prior art transfer casks do not consider the simultaneous or interchangeable size and weight considerations of the present disclosure.

Accordingly, embodiments of the present disclosure are directed to spent fuel transfer systems and methods that overcome the size and/or weight limitations that can be present in some fuel pool facilities during the transfer process from wet storage to dry storage. Described herein are various systems and methods related to a two-piece transfer cask system that includes a lightweight-partially shielded transfer cask with a smaller diameter than prior art transfer casks and a shielding sleeve that can be placed around the lightweight transfer cask to provide supplemental shielding during the transfer process from wet storage to dry storage.

Referring now to FIG. 1, shown is a drawing of an example of a transfer cask 100 according to various embodiments. The transfer cask 100 shown in FIG. 1 comprises a cylindrical transfer cask body. It should be understood that there may be other cross-sectional shapes for the transfer cask 100 such as, for example, a square, a rectangle, an octagon, a triangle, etc., as well as a variety of lengths. The transfer cask 100 comprises a sidewall that defines an interior channel that extends from a top end to a bottom end 109 of the transfer cask 100. The transfer cask 100 may comprise fewer shielding layers of typical transfer casks.

These shielding layers are fixed and their thickness is optimized for gamma and/or neutron shielding, meeting structural and thermal weight requirements of the transfer cask 100. The material of constructions may include metals, gamma or neutron shielding materials in solid forms fixed as an integral part of the system. Accordingly, the transfer cask 100 has a smaller diameter than typical transfer casks and may weigh less allowing the transfer cask 100 to be used in facilities with size and weight limitations. However, the fewer layers of shielding can increase the risk of radiation exposure during the transfer process.

Figure 2:
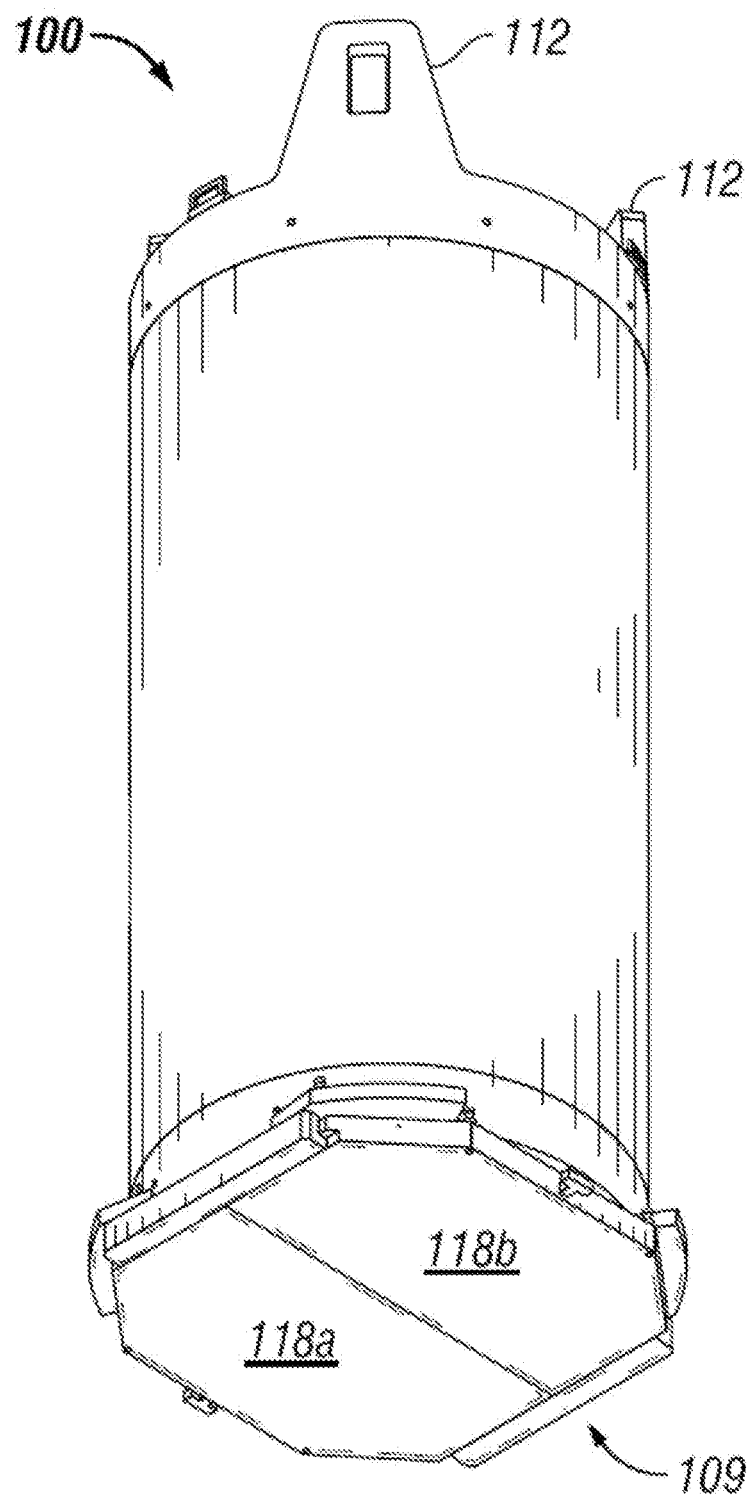
FIG. 2 is a drawing of an example of a perspective view of the transfer cask of FIG. 1 according to various embodiments of the present disclosure.
Figure 3:
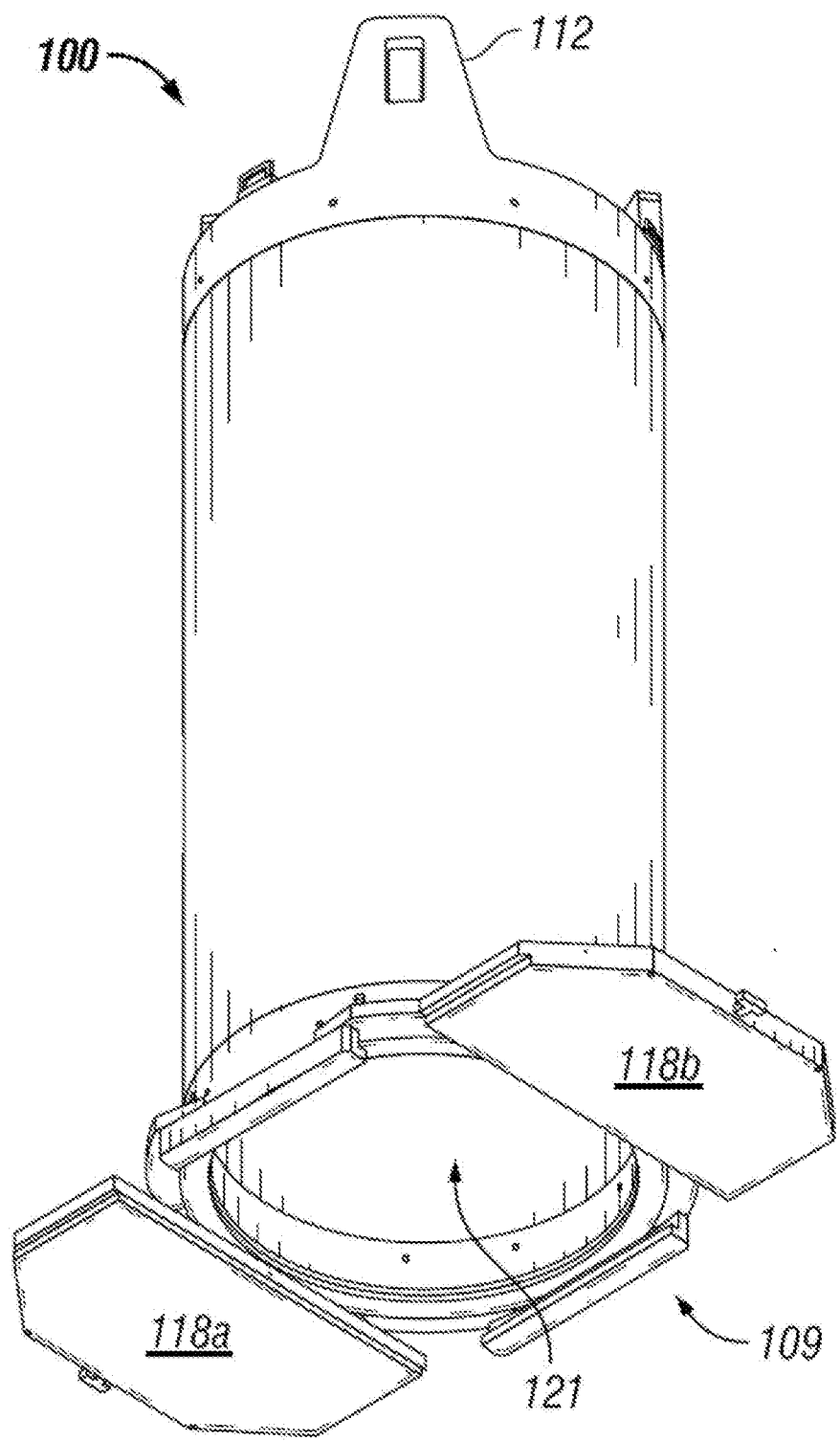
FIG. 3 is a drawing of an example of another perspective view of the transfer cask of FIG. 1 according to various embodiments of the present disclosure.

As shown in FIG. 1, the top end of the transfer cask 100 includes an opening to the cavity 121 (FIG. 3). Accordingly, the transfer cask 100 may receive the spent nuclear fuel for transfer via the opening of the top end of the transfer cask 100 where it is typically accommodated inside a canister (not shown) that is placed within the cavity 121. The transfer cask 100 further includes a bottom portion 109, one or more lifting members 112, and one or more canister retainer tabs 115. The bottom portion 109 may comprise one or more support tabs 110 for supporting a shielding sleeve 400 (FIG. 4) and one or more transfer shield doors 118a, 118b (FIG. 2) disposed at the bottom portion 109 of the transfer cask 100.

The lifting members 112 may be uniformly disposed along a top portion the transfer cask 100. The lifting members 112 may extend upwardly from the top portion of the transfer cask 100. The lifting members 112 are designed such that a lifting system 700 (FIG. 7), such as, for example, a lifting yoke and crane, may engage with apertures disposed within the lifting members 112 and support the transfer cask 100 during the transfer process. For example, the lifting system 700 may be used to submerge the transfer cask 100 into a transfer area of a fuel pool for receiving the spent nuclear fuel, lift the transfer cask 100 out of the fuel pool for conditioning, and position the transfer cask 100 over the transport or storage cask 903 (FIG. 9) for placement of the spent nuclear fuel into the transport or storage cask 903. The canister retainer tabs 115 may comprise protrusions that are configured to attach with components of a canister when the canister is loaded into the transfer cask 100. The canister retainer tabs 115 help secure the canister in place while the transfer cask 100 is submerged in the fuel pool. As such, the canister retainer tabs 115 can be used to avoid inadvertent lifting of the canister from the transfer cask 100 during all postulated normal and accident conditions.

Moving on to FIGS. 2 and 3, shown are drawings of non-limiting examples of perspective views of the bottom end of the transfer cask 100 of FIG. 1 according to various embodiments of the present disclosure. The bottom end 109 of the transfer cask 100 comprises the one or more transfer shield doors 118a, 118b (hereinafter 118) that may be opened or closed during the transfer process. When closed, the transfer shield doors 118 provide a seal at the bottom end 109 of the transfer cask 100. In some embodiments, the transfer shield doors 118 may comprise a radiation shielding configured to shield any radiation emitted from the spent nuclear fuel, thereby avoiding an increased risk of radiation exposure and/or accident during the conditioning and transfer process.

Figure 9:
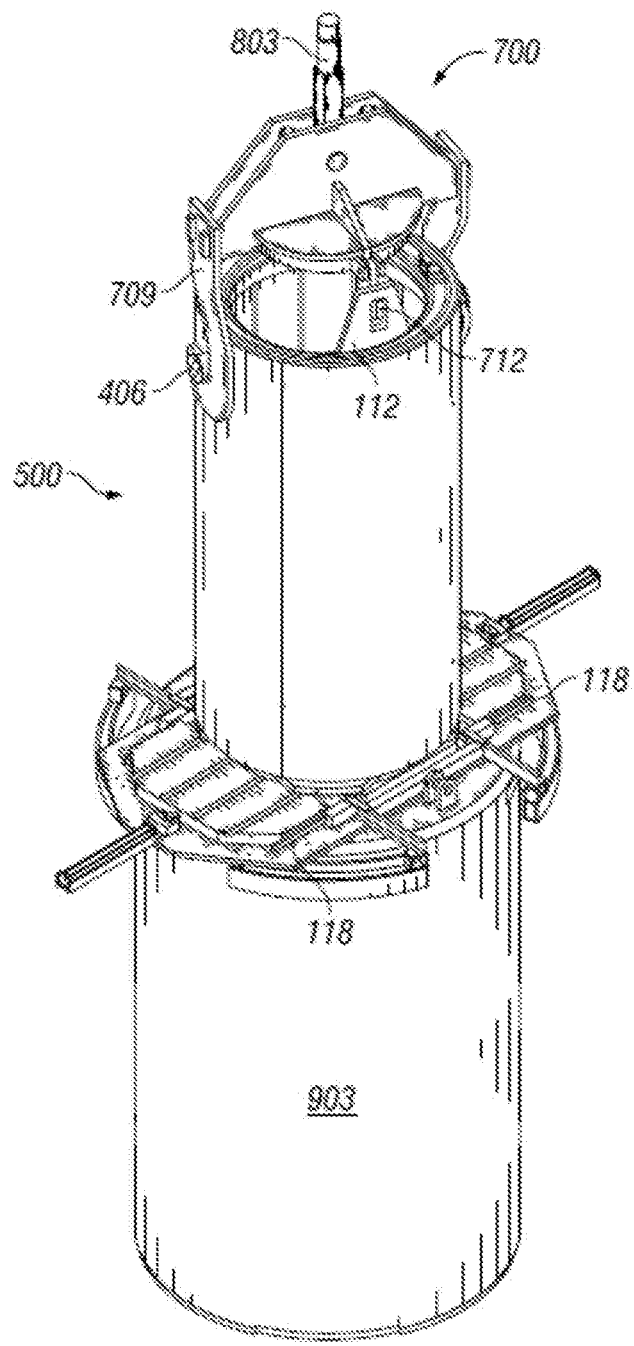
FIG. 9 is a drawing of the lifting system of FIG. 7 lifting the transfer cask of FIG. 1 containing spent nuclear fuel and the shielding sleeve FIG. 4, the lifting system positioning the transfer cask and shielding sleeve over a storage or transport cask for transfer of the canister according to various embodiments of the present disclosure.

In a non-limiting example, as shown in FIG. 2, the transfer shield doors 118 may be closed to allow the transfer cask 100 to receive and support the canister and the spent nuclear fuel transferred from the wet storage. In another non-limiting example, as shown in FIG. 3, the transfer shield doors 118 may be opened for the transferring of the spent nuclear fuel canister with spent fuel from the cavity 121 of the transfer cask 100 to the transport or storage cask 903 (FIG. 9).

Figure 4:
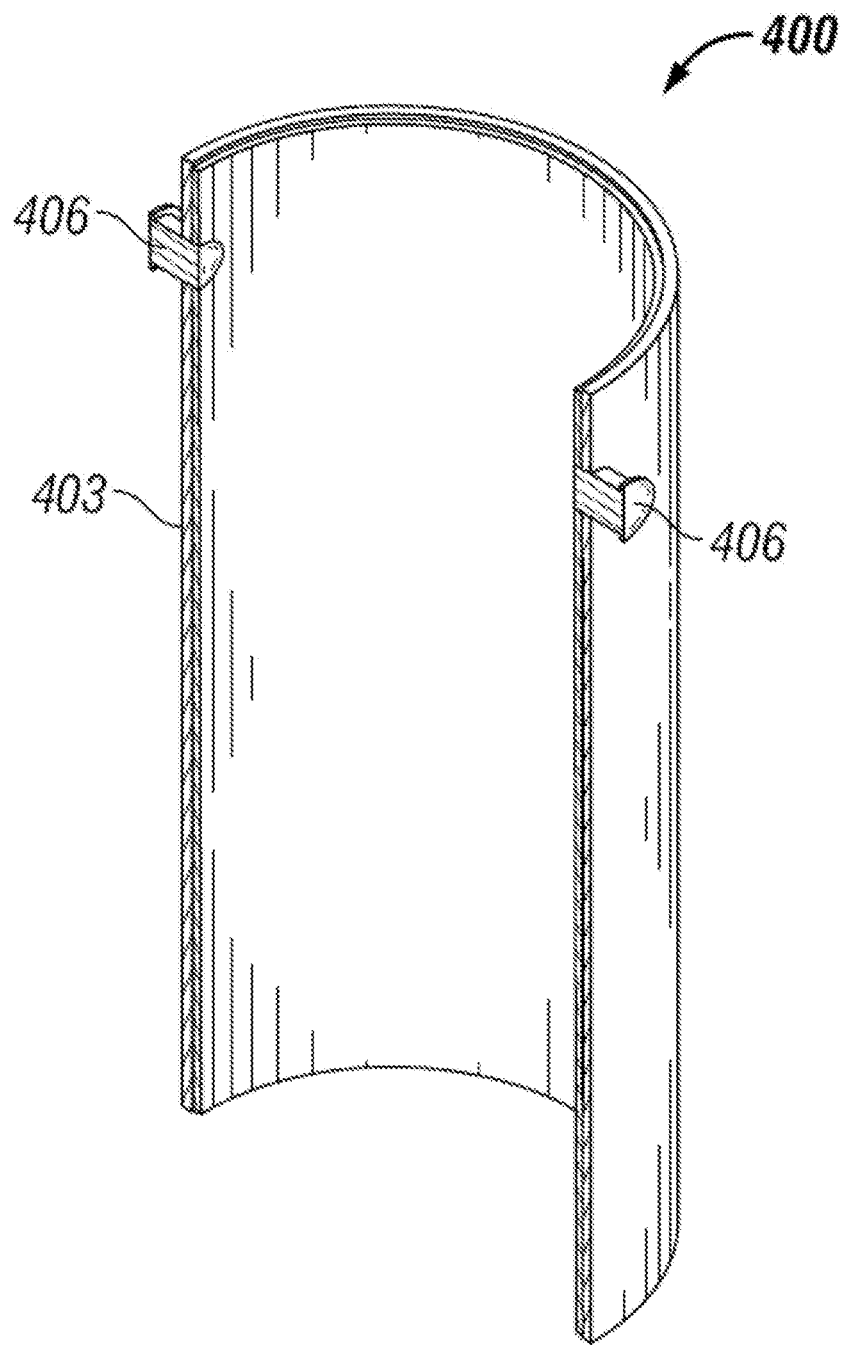
FIG. 4 is a drawing of an example of a cross-sectional view of a shielding sleeve used to provide supplemental shielding for the transfer cask of FIG. 1 according to various embodiments of the present disclosure.
Figure 7:
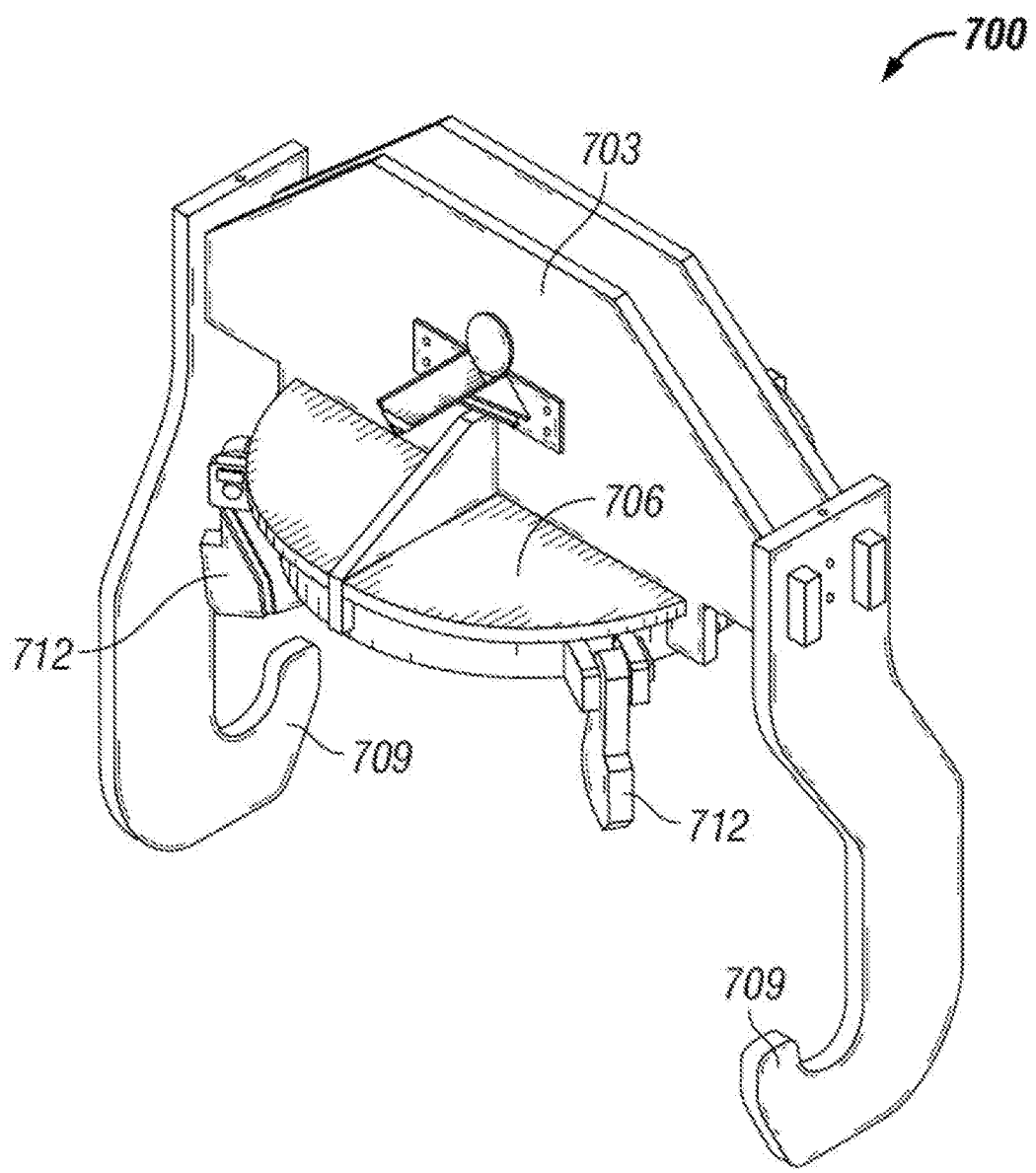
FIG. 7 is a drawing of an example of a lifting system for lifting the transfer cask of FIG. 1 and/or the shielding sleeve of FIG. 4 according to various embodiments of the present disclosure.

Turning now to FIG. 4, shown is a drawing of an example of a cross sectional view of a shielding sleeve 400 according to various embodiments of the present disclosure. The shielding sleeve 400 comprises a tubular body extending from a first end to a second end and two or more trunnion pins 406 protruding outwardly from the outer wall of the shielding sleeve 400. The two or more trunnion pins 406 are uniformly disposed along the outer peripheral of the shielding sleeve 400 and are configured to engage with the first lifting hooks 709 (FIG. 7) extending from a lifting system 700 (FIG. 7). The shielding sleeve 400 is designed to surround the outer sidewall of the transfer cask 100. In some embodiments, the shielding sleeve 400 surrounds the outer sidewall of the transfer cask 100 leaving the bottom end 109 and the top end including the lifting members 112 of the transfer cask 100 exposed.

The shielding sleeve 400 further comprises a radiation shield 403 that provides supplemental shielding from radiation emitted from spent nuclear fuel contained in the transfer cask 100 during the transfer from wet storage to dry storage. The radiation shield 403 may comprise neutron shielding, gamma shielding or both. The radiation shield 403 reduces the risk of radiation exposure and/or accident during the conditioning and transfer process. The shielding sleeve 400 may comprise a liquid shielding or a solid shielding. The liquid shielding may comprise one or more compartments within the shielding sleeve 400 which contain water and/or other type of appropriate liquid for shielding radiation. Since neutrons may be slowed and the chemical bonds broken upon interaction with the hydrogen of the water, the water shields the emitted radiation.

In some embodiments, the shielding sleeve 400 may comprise solid shielding, such as, for example, a modular shielding system comprising modular fins may be used to shield neutrons and dissipate thermal energy from the cask body. An example of a solid radiation shield is discussed in greater detail in U.S. Pat. No. 7,342,989, issued on Mar. 11, 2008, and entitled "Apparatuses and Methods for Mechanical Shielding and Cooling," which is hereby incorporated by reference in its entirety. The solid shield may extend from the exterior sidewall of the shielding sleeve 400.

Figure 5:
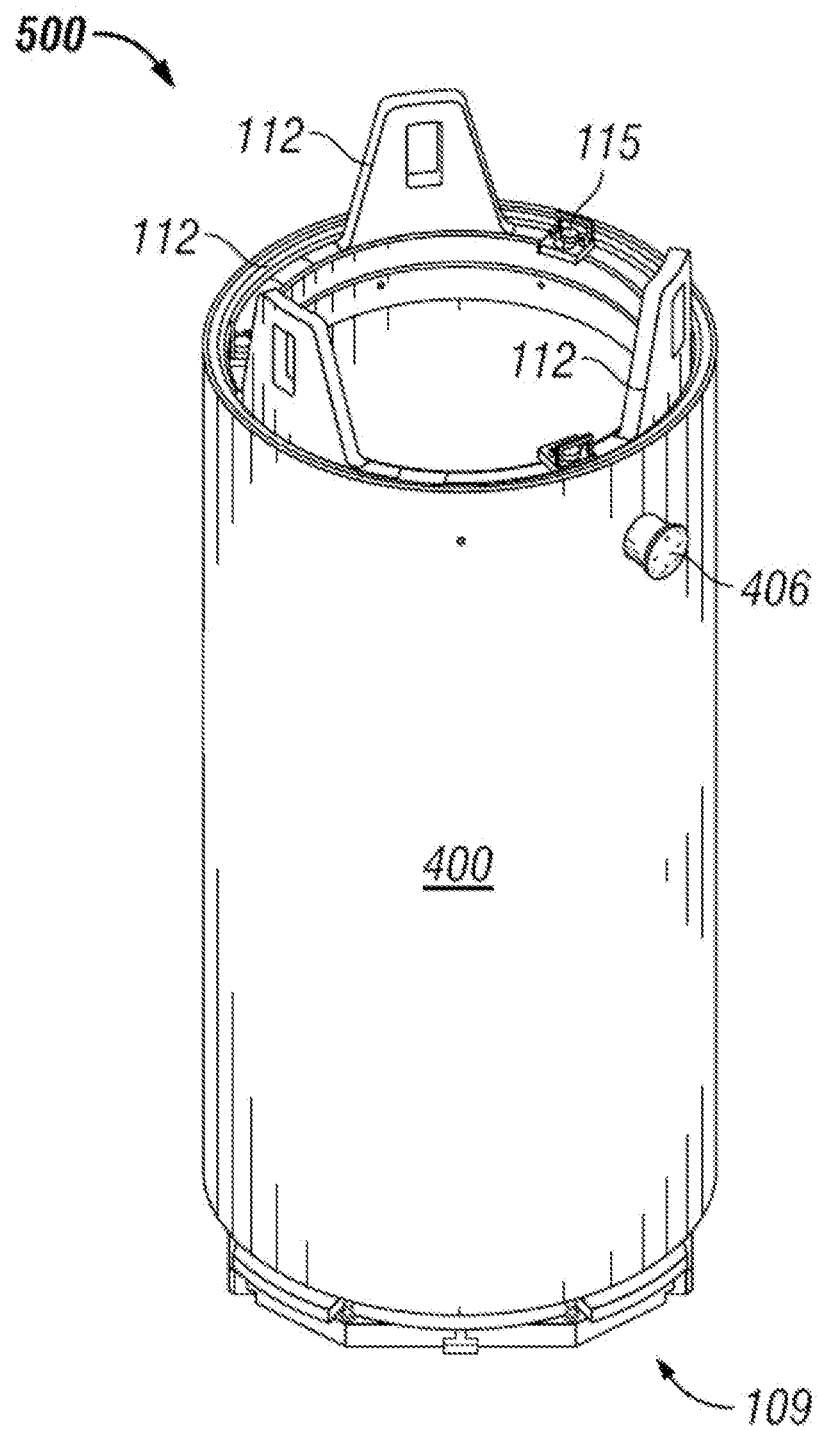
FIG. 5 is a drawing of an example of the shielding sleeve of FIG. 4 surrounding the transfer cask of FIG. 1 according to various embodiments of the present disclosure.
Figure 6:
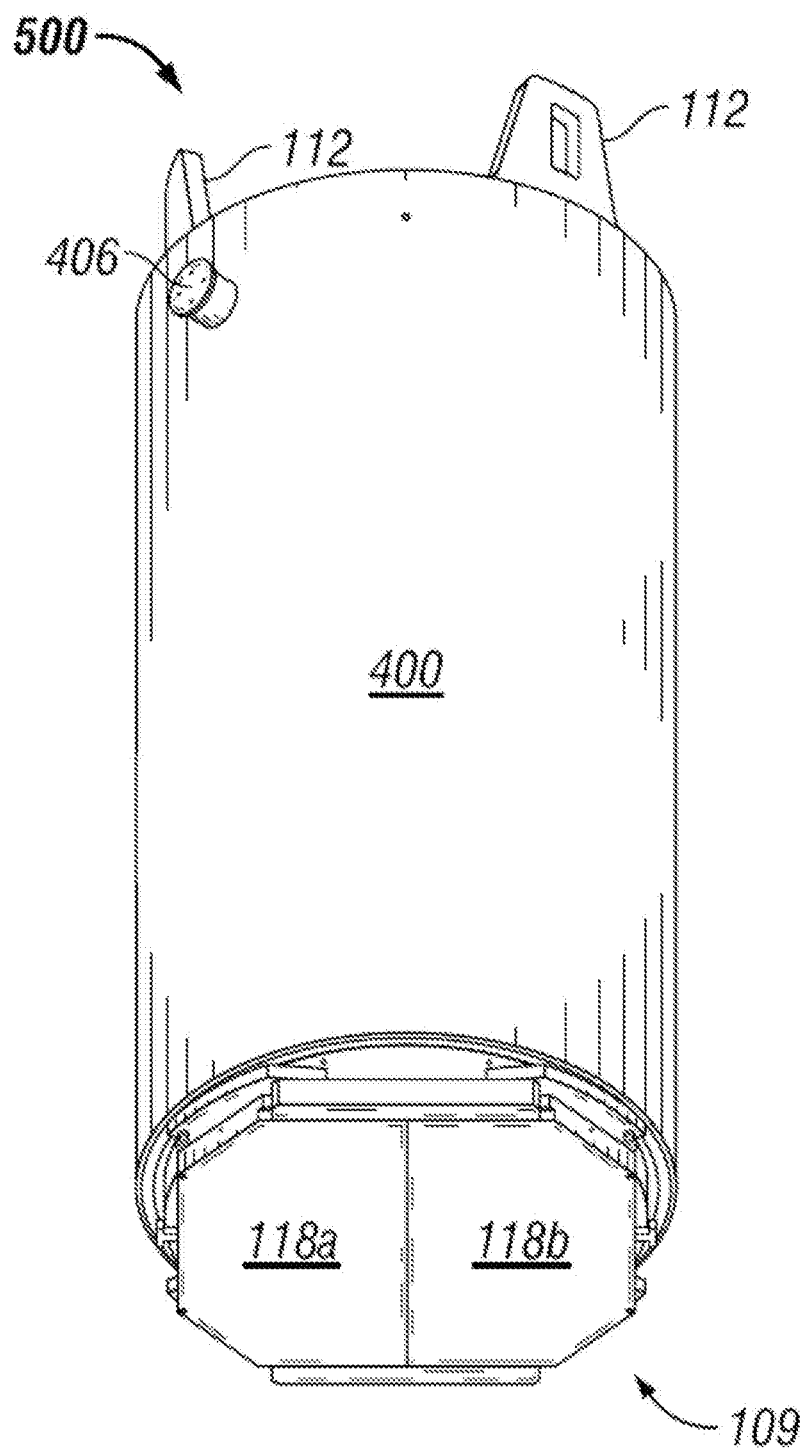
FIG. 6 is a drawing of another example of the shielding sleeve of FIG. 4 surrounding the transfer cask of FIG. 1 according to various embodiments of the present disclosure.

Turning now to FIGS. 5 and 6, shown are drawings of non-limiting examples of a transfer cask system 500 comprising the shielding sleeve 400 disposed around the transfer cask 100 according to various embodiments of the present disclosure. The shielding sleeve 400 is separate and independent from the transfer cask 100. The shielding sleeve 400 surrounds the exterior sidewall of the transfer cask 100 leaving the lifting members 112 and bottom portion 109 of the transfer cask 100 exposed. Since the transfer cask 100 may not have sufficient shielding due to a lack of shielding layers to compensate for the limited size and/or weight limitations as discussed above, the shielding sleeve 400 provides supplemental shielding to the transfer cask 100.

At various moments during the transfer process, the shielding sleeve 400 may be suspended by a lifting system (FIG. 7) or may rest on the transfer cask 100. When in place and released from the first lifting hooks 709 of a lifting system 700, the shielding sleeve 400 may rest on the support tabs 110 on the bottom portion 109 of the transfer cask 100, thereby transferring the weight of the shielding sleeve 400 to the transfer cask 100. When the shielding sleeve 400 is not released by the first lifting hooks 709 of the lifting system 700, the shielding sleeve 400 is suspended, thereby, not touching the support tabs 110 of the transfer cask 100. Therefore, the shielding sleeve load is not transferred to the transfer cask 100 and/or the floor/support structure where it is placed.

With reference now to FIG. 7, shown is a drawing of a non-limiting example of the lifting system 700 designed to simultaneously lift the transfer cask 100 and the shielding sleeve 400 according to various embodiments of the present disclosure. The lifting system 700 comprises a first support assembly 703 and a second support assembly 706. The first support assembly 703 comprises two or more substantially parallel plates extending outwardly along the longitudinal axis of the device. The lifting system 700 further comprises a plurality of first lifting hooks 709 that are attached to the ends of the plates and extend downwardly from the first support assembly 703. The first lifting hooks 709 are configured to engage with the trunnion pins 406 of the shielding sleeve 400. Accordingly, the first lifting hooks 709 are used to engage with and support the shielding sleeve 400 during the transfer process. The first lifting hooks 709 can comprise J-hooks that are designed to engage with the trunnion pins 406 of the shielding sleeve 400 as the lifting system 700 is lowered over the shielding sleeve 400. In some embodiments, the first lifting hooks 709 are not situated as a mirror image of one another on the lifting system 700. Accordingly, the lifting system 700 may be lowered substantially on center over the shielding sleeve 400 such that each of the first lifting hooks 709 are off by a few degrees below the trunnion pins 406. The first lifting hooks 709 may engage with the trunnion pins 406 by rotating the lifting system 709 clockwise and slightly lifting the shielding sleeve 400 so that the first lifting hooks 709 properly engage with the trunnion pins 406.

The second support assembly 706 is affixed perpendicular to the first support assembly 703. The second support assembly 706 may comprise a plate that that includes a plurality of second lifting hooks 712 uniformly disposed around the peripheral of the plate. Although the plate of the second support assembly 706 of FIG. 7 is circular, the plate may comprise another shape such as, for example, a square, a rectangle, a triangle, a hexagon, etc. The plurality of second lifting hooks 712 are configured to engage with the lifting members 112 of the transfer cask 100. The plurality of second lifting hooks can be controlled by hydraulic components to simulate the second lifting hooks 712 to engage and disengage with the transfer cask 100 hydraulically.

Figure 8A:
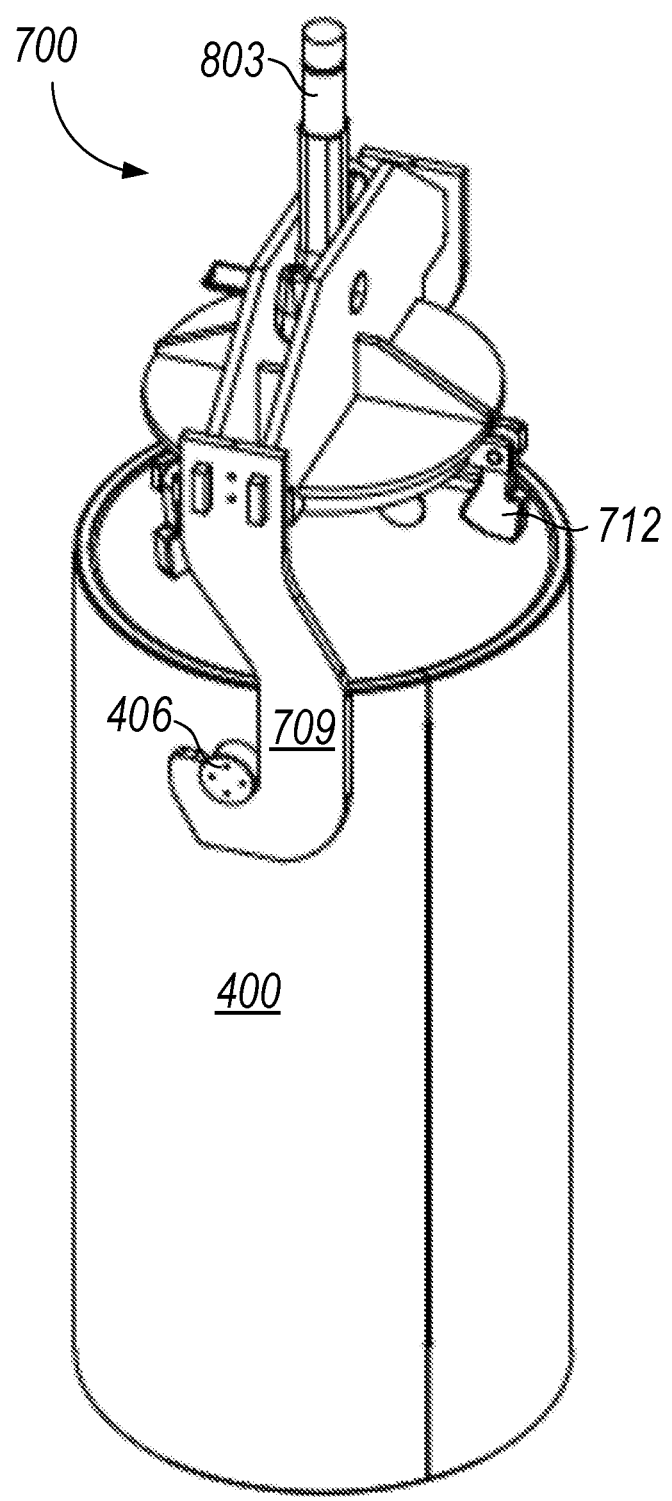
FIG. 8A is a drawing of an example of the lifting system of FIG. 7 lifting the shielding sleeve of FIG. 4 according to various embodiments of the present disclosure.

Moving on to FIG. 8A, shown is the lifting system 700 engaged with and supporting the shielding sleeve 400 according to various embodiments of the present disclosure. As shown in FIG. 8A, the first lifting hooks 706 are engaged with the trunnion pins 406 of the shielding sleeve 400. The lifting system 700, as shown in FIG. 8, further comprises a lifting pin 803 affixed to the first support assembly 703 and the second support assembly 706 and extending along the longitudinal axis of the lifting system 700. The lifting pin 803 may comprise a hydraulic piston designed to stimulate the second lifting hooks 712 of the lifting system when the lifting system 700 is used to lift the transfer cask 100. The lifting pin 803 can be coupled to a crane, and/or other suitable device for transfer.

The lifting system 700 can support shielding sleeve 400 as it is placed over the transfer cask 100 to provide supplemental shielding. For example, shielding sleeve 400 may be immersed in the fuel pool area and placed around the transfer cask 100 that has been loaded with the spent fuel. The shielding sleeve 400 may slide overtop the transfer cask 100 as it is lowered into the fuel pool. Once the shielding sleeve 400 is appropriately placed around the transfer cask 100, and the second lifting hooks 712 are aligned with the lifting members of the transfer cask 100, the second lifting hooks 712 may be activated to engage with the lifting members of the transfer cask 100. Accordingly, the lifting system 700 can then simultaneously lift the transfer cask 100 and shielding sleeve 400 out of the fuel pool or other laydown area.

Figure 8B:
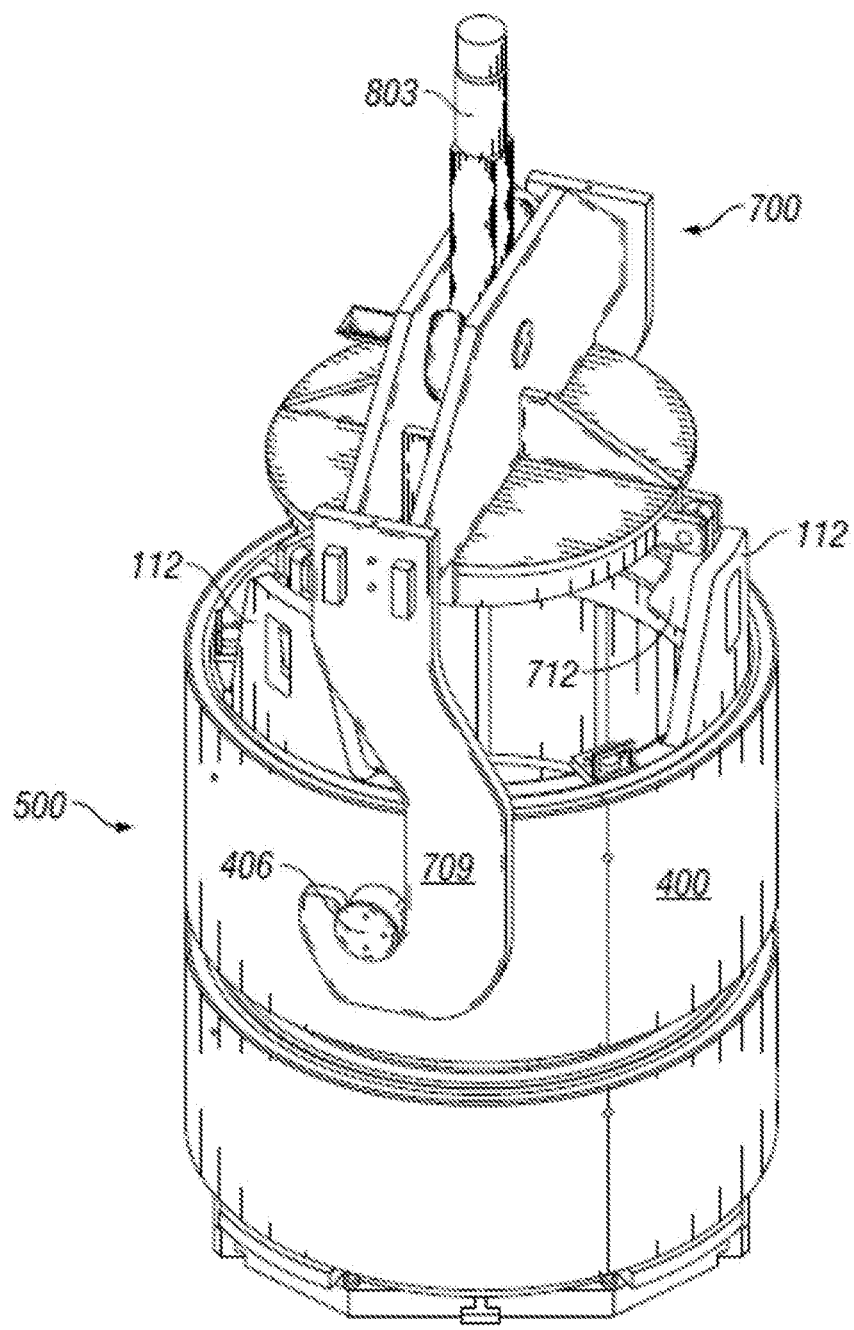
FIG. 8B is a drawing of an example of the lifting system of FIG. 7 simultaneously lifting the shielding sleeve of FIG. 4 and the transfer cask of FIG. 1 according to various embodiments of the present disclosure.

Referring next to FIG. 8B, shown is the lifting system 700 engaged with the transfer cask system 500 comprising the transfer cask 100 and the shielding sleeve 400 according to various embodiments of the present disclosure. As shown in FIG. 8B, the first lifting hooks 709 are engaged with a trunnion pin 406 of the shielding sleeve 400 that is situated around the transfer cask 100. Each of the second lifting hooks 712 engages with a respective aperture of the lifting members 112 of the transfer cask 100. Accordingly, the lifting system 700 is configured to engage and support both the shielding sleeve 400 and the transfer cask 100. The lifting system 700, as shown in FIG. 8B, further comprises a lifting pin 803 affixed to the first support assembly 703 and the second support assembly 706 and extending along the longitudinal axis of the lifting system 700. The lifting pin 803 may comprise a hydraulic piston designed to stimulate the second lifting hooks 712 of the lifting system. The lifting pin 803 can be coupled to a crane, and/or other suitable device for transfer.

As illustrated in FIGS. 8A and 8B, the lifting system 700 can lift the shielding sleeve 400 and the transfer cask 100 simultaneously or independently. When lifting simultaneously, the lifting system 700 is configured to support the shielding sleeve 400 without transferring the weight of the shielding sleeve 400 to the transfer cask 100 when the shielding sleeve 400 is retained by the first lifting hooks 706. As such, the shielding sleeve 400 may be suspended by the lifting system 700 and crane while the shielding sleeve 400 is immersed in the fuel pool during the loading process or is transferred to another rest area. Accordingly, the addition of the shielding sleeve 400 without disengagement from the lifting system 700 does not add weight to the fuel pool floor.

Moving on to FIG. 9, shown is a drawing of a non-limiting example of the transfer cask system 500 suspended above a transport or storage cask 903 for transfer of spent nuclear fuel contained within the transfer cask 100 according to various embodiments of the disclosure. The transfer cask system 500 is suspended over the transport or storage cask 903 by the lifting system 700 which is attached to both the lifting members 112 of the transfer cask 100 and the trunnion pins 406 of the shielding sleeve 400. The transfer shield doors 118 are opened so that a spent nuclear fuel canister containing spent nuclear fuel (not shown) and disposed within the transfer cask 100 may be transferred to the transport or storage cask 903. The transport or storage cask 903 is designed to partially dissipate cool the heat and properly shield the radiation emitted from the spent nuclear fuel canister.

Figure 10:
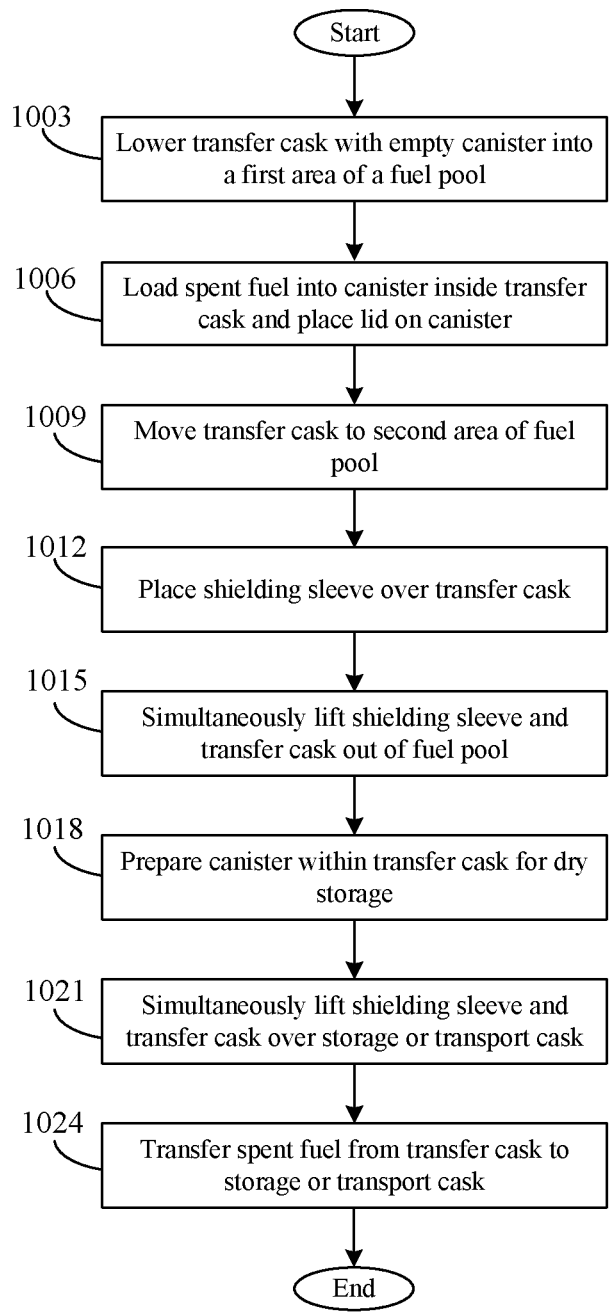
FIGS. 10, 11, and 12 are flowcharts illustrating methods according to various embodiments of the present disclosure.

With reference to FIG. 10, shown is a flowchart that provides one example of transferring spent nuclear fuel from wet storage to dry storage according to various embodiments of the present disclosure. It is understood that the flowchart of FIG. 10 merely provides examples of the many different types of functional arrangements that may be employed to implement the operation of the methods as described herein.

At reference numeral 1003, the transfer cask 100 (FIG. 1) is lowered into a first area of the fuel pool. The lifting system 700 (FIG. 7) is used to lower the transfer cask 100 into the fuel pool. The second lifting hooks 712 (FIG. 7) of the lifting system 700 are engaged with apertures of the lifting members 112 (FIG. 1) extending upwardly from the transfer cask 100. The first area of the fuel pool is the area in which the spent nuclear fuel is to be loaded into the cavity 121 (FIG. 1) of the submerged transfer cask 100.

At reference numeral 1006, the spent nuclear fuel (not shown) is loaded into the transfer cask 100 that is submerged in the first area of the fuel pool. At this point, after the spent fuel is loaded, the canister lid is lowered into place on the canister. At reference numeral 1009, the transfer cask 100 containing the spent nuclear fuel canister with spent fuel is moved to a second area of the fuel pool. The second area of the fuel pool may not have the space or weight limitations that were present in the first area of the fuel pool. At this point, the lifting system 700 may disengage with the transfer cask 100 so that the lifting system 700 can be used to place the shielding sleeve 400 (FIG. 4) over the transfer cask 100 prior to removal of the transfer cask 100 from the water.

At reference numeral 1012, the shielding sleeve 400 is immersed in the second area of the fuel pool and placed around the transfer cask 100 that contains the spent nuclear fuel. The trunnion pins 406 (FIG. 4) of the shielding sleeve are engaged with the first lifting hooks 709 (FIG. 7) of the lifting system 700. The shielding sleeve 400 may slide overtop the transfer cask 100 as it is lowered into the fuel pool. Once the shielding sleeve 400 is appropriately placed around the transfer cask 100, and the second lifting hooks 712 are aligned with the lifting members 112 of the transfer cask 100, the second lifting hooks 712 of the lifting system 700 are activated to engage with the lifting members 112 of the transfer cask 100. The increased diameter of the transfer cask system 500 associated with the diameter of the shielding sleeve 400 is no longer a concern—since the second area of the fuel pool does not have the same size limitations as the first area of the fuel pool. In addition, because the shielding sleeve 400 is supported by the lifting system 700, the addition of the shielding sleeve 400 does not increase the amount of weight on the fuel pool floor or rack.

At reference numeral 1015, the lifting system 700 is used to simultaneously lift the shielding sleeve 400 and the transfer cask 100 containing the spent nuclear fuel out of the fuel pool. Although the shielding sleeve 400 and the transfer cask 100 are two separate and independent components of the transfer cask system 500, the configuration of the lifting system 700 allows both the shielding sleeve 400 and transfer cask 100 to be lifted simultaneously from the fuel pool. The transfer cask system 500 is placed on a platform outside of the fuel pool so that the spent nuclear fuel can be further prepared for dry storage.

At reference numeral 1018, the fuel canister within the transfer cask 100 is conditioned and properly sealed prior to transfer to a transport or storage cask 903. During the conditioning and sealing process, the shielding sleeve 400 provides additional radiation shielding around the transfer cask 100 so that there is a reduced risk of exposure during the conditioning and sealing process.

At reference numeral 1021, the lifting system 700 engages with the transfer cask system 500 and simultaneously lifts the transfer cask 100 and the shielding sleeve 400 from the platform. The lifting system 700 suspends the transfer cask system 500 over a storage or transport cask 903 to allow for the transfer of the spent nuclear fuel from the transfer cask 100 to the storage or transport cask 903. At reference numeral 1024, the transfer shield doors 118 of the transfer cask 100 are opened allowing the canister of spent nuclear fuel to be transferred from cavity 121 of the transfer cask 100 to the appropriate storage or transport cask 903.

Figure 11:
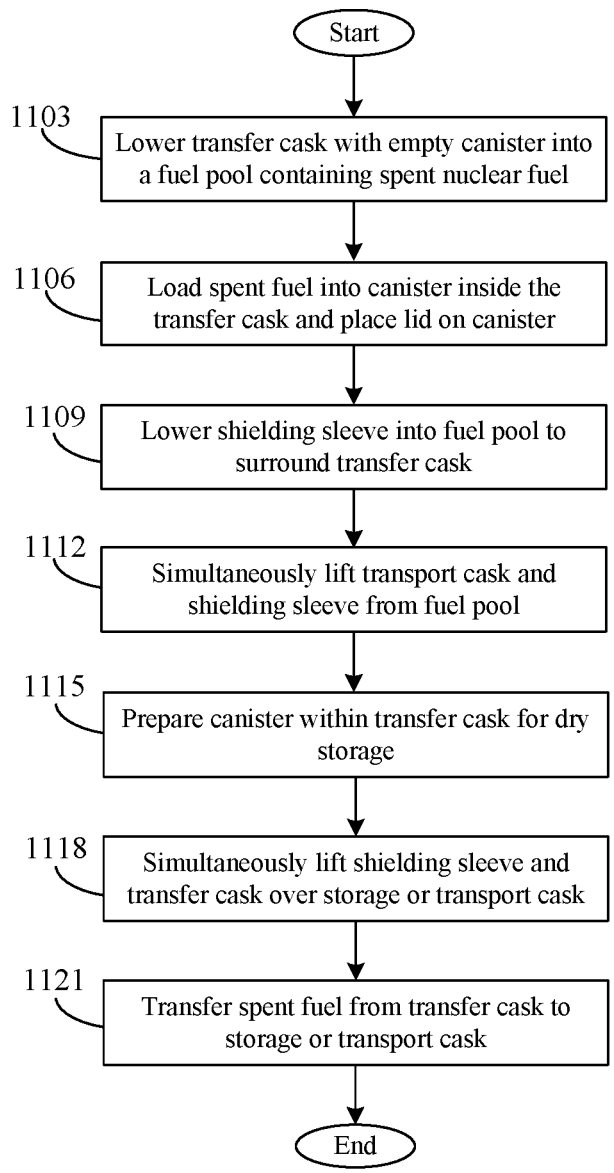

With reference to FIG. 11, shown is a flowchart that provides one example of transferring spent nuclear fuel from wet storage to dry storage according to various embodiments of the present disclosure. It is understood that the flowchart of FIG. 11 merely provides examples of the many different types of functional arrangements that may be employed to implement the operation of the methods as described herein.

At reference numeral 1103, the transfer cask 100 containing an empty canister is lowered and immersed into a fuel pool containing spent nuclear fuel via the lifting system 700. The transfer cask 100 is attached to the lifting system 700 via the second lifting hooks 712 of the lifting system 700 which are engaged with the lifting members 112 of the transfer cask 100. At reference numeral 1106, the spent nuclear fuel (not shown) is loaded into the cavity 121 of the transfer cask 100 that is submerged into the fuel pool. At this point, after the fuel is loaded, the canister lid is lowered into place.

At reference numeral 1109, the shielding sleeve 400 is lowered into the fuel pool via the lifting system 700 that is attached to the first lifting hooks 709 of the shielding sleeve 400. The shielding sleeve 400 is lowered into the fuel pool and situated around the exterior wall of the transfer cask 100 that has been loaded with the spent fuel. The shielding sleeve 400 may be continuously supported by the lifting system 700, so that no additional weight is added to the floor of the fuel pool. Accordingly, the weight limitations of the fuel pool floor are not impacted by the addition of the shielding sleeve 400 surrounding the transfer cask 100. Once the shielding sleeve 400 is appropriately positioned around the transfer cask 100 and the second lifting hooks 712 of the lifting system 700 are aligned with the eyelets of the lifting members 112 of the transfer cask 100, the second lifting hooks 712 can be activated to engage with the lifting members 112.

At reference numeral 1112, the lifting system 700 is used to simultaneously lift the transfer cask system 500 comprising both the transfer cask 100 containing the spent nuclear fuel and the shielding sleeve 400 out of the fuel pool. The lifting system 700 positions the transfer cask system 500 on a rest area with work platforms so that the canister of spent nuclear fuel within the transfer cask 100 can be prepared and conditioned for dry storage. At reference numeral 1115, the fuel canister within the transfer cask 100 is conditioned and properly sealed prior to the transfer of the spent nuclear fuel to a transport or storage cask 903. During the conditioning and sealing process, the shielding sleeve 400 provides additional radiation shielding around the transfer cask 100 so that there is a reduced risk of exposure during the conditioning and sealing process.

At reference numeral 1118, the lifting system 700 engages with the transfer cask system 500 and simultaneously lifts the transfer cask 100 and the shielding sleeve 400 from the platform and suspends the transfer cask system 500 over a storage or transport cask 903 to allow for the transfer of the canister of spent nuclear fuel from the transfer cask 100 to the storage or transport cask 903. At reference numeral 1121, the transfer shield doors 118 of the transfer cask 100 are opened allowing the canister of spent nuclear fuel to be transferred from the cavity 121 of the transfer cask 100 to the appropriate storage or transport cask 903.

Figure 12:
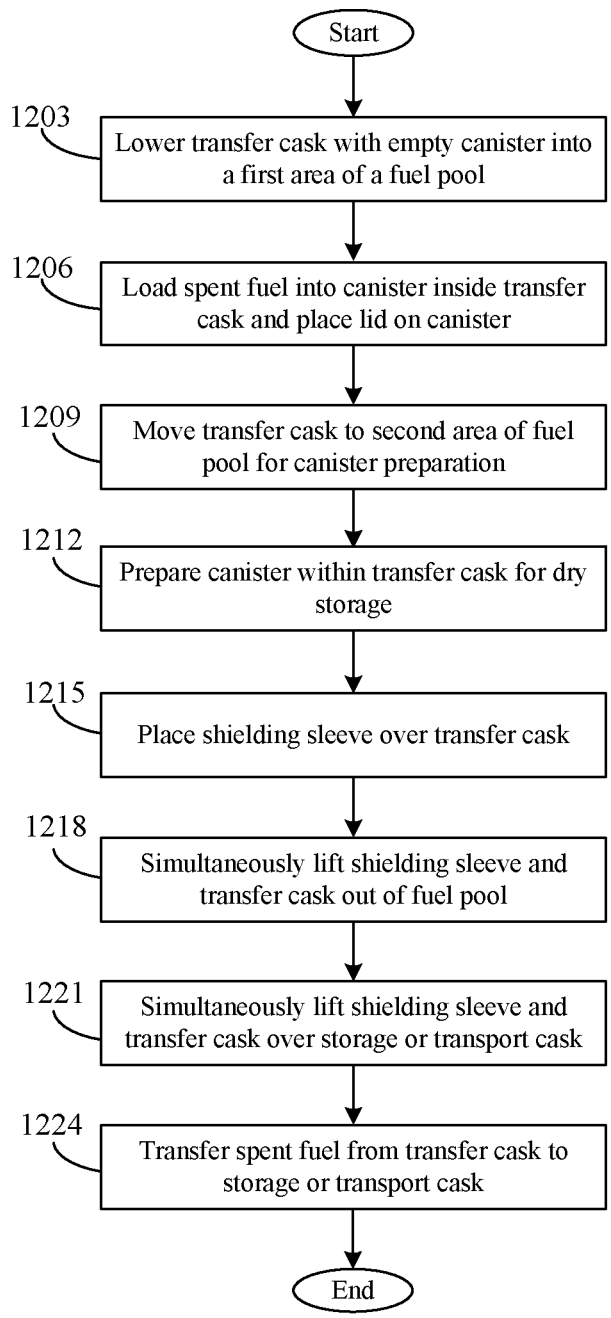

With reference to FIG. 12, shown is a flowchart that provides one example of transferring spent nuclear fuel from wet storage to dry storage according to various embodiments of the present disclosure. It is understood that the flowchart of FIG. 12 merely provides examples of the many different types of functional arrangements that may be employed to implement the operation of the methods as described herein.

At reference numeral 1203, the transfer cask 100 is lowered into a first area of the fuel pool. The lifting system 700 is used to lower the transfer cask 100 into the fuel pool. The second lifting hooks 712 of the lifting system 700 are engaged with apertures of the lifting members 112 extending upwardly from the transfer cask 100. The first area of the fuel pool is the area in which the spent nuclear fuel is to be loaded into the cavity 121 of the submerged transfer cask 100.

At reference numeral 1206, the spent nuclear fuel (not shown) is loaded into the transfer cask 100 that is submerged in the first area of the fuel pool. At this point, after the spent fuel is loaded, the canister lid is lowered into place. At reference numeral 1209, the transfer cask 100 containing the spent nuclear fuel canister loaded with spent fuel is moved to a second area of the fuel pool or laydown area within the facility for preparation of the canister for dry storage. At reference numeral 1212, the fuel canister within the transfer cask 100 is conditioned and properly sealed prior to transfer to a transport or storage cask 903.

At reference numeral 1215, the shielding sleeve 400 is immersed in the second area and placed around the transfer cask 100 that contains the spent nuclear fuel. The trunnion pins 406 of the shielding sleeve are engaged with the first lifting hooks 709 of the lifting system 700. The shielding sleeve 400 may slide overtop the transfer cask 100 as it is lowered into the second area. Once the shielding sleeve 400 is appropriately placed around the transfer cask 100, and the second lifting hooks 712 are aligned with the lifting members 112 of the transfer cask 100, the second lifting hooks 712 of the lifting system 700 are activated to engage with the lifting members 112 of the transfer cask 100. The increased diameter of the transfer cask system 500 associated with the diameter of the shielding sleeve 400 is no longer a concern since the second area does not have the same size limitations as the first area. In addition, because the shielding sleeve 400 is supported by the lifting system 700, the addition of the shielding sleeve 400 does not increase the amount of weight on the fuel pool floor or rack.

At reference numeral 1218, the lifting system 700 is used to simultaneously lift the shielding sleeve 400 and the transfer cask 100 containing the spent nuclear fuel out of the fuel pool. Although the shielding sleeve 400 and the transfer cask 100 are two separate and independent components of the transfer cask system 500, the configuration of the lifting system 700 allows both the shielding sleeve 400 and transfer cask 100 to be lifted simultaneously from the fuel pool. The transfer cask system 500 may be placed on a platform outside of the fuel pool so that the spent nuclear fuel can be further prepared for dry storage.

At reference numeral 1221, the lifting system 700 simultaneously lifts the transfer cask 100 and the shielding sleeve 400 and suspends the transfer cask system 500 over a storage or transport cask 903 to allow for the transfer of the canister of spent nuclear fuel from the transfer cask 100 to the storage or transport cask 903. At reference numeral 1224, the transfer shield doors 118 of the transfer cask 100 are opened allowing the canister of spent nuclear fuel to be transferred from cavity 121 of the transfer cask 100 to the appropriate storage or transport cask 903.

Although the flowcharts of FIGS. 10-12 show a specific order of execution, it is understood that the order of execution may differ from that which is depicted. For example, the order of execution of two or more steps may be scrambled relative to the order shown. Also, two or more steps shown in succession in FIGS. 10-12 may be executed concurrently or with partial concurrence. Further, in some embodiments, one or more of the steps shown in FIGS. 10-12 may be skipped or omitted.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A transfer cask system for transferring spent nuclear fuel from wet storage to dry storage, the transfer cask system comprising:
    a lifting device comprising a first support assembly and a second support assembly, the first support assembly comprising a plurality of parallel plates extending outwardly along a longitudinal axis of the lifting device and a plurality of first lifting hooks coupled to ends of the plurality of parallel plates and extending downwardly from the first support assembly, the second support assembly being affixed perpendicular to the first support assembly, and the second support assembly comprising a second plate and a plurality of second lifting hooks uniformly disposed around a peripheral of the second plate;
    a cylindrical container comprising a side wall, a top, and a bottom that define a cavity configured to support a canister comprising spent nuclear fuel, the plurality of second lifting hooks being engaged with a plurality of lifting members extending upwardly from the top of the cylindrical container; and
    a cylindrical sleeve disposed around an exterior of the cylindrical container, the cylindrical sleeve comprising a plurality of trunnion pins extending outwardly from an exterior of the cylindrical sleeve and being engaged with the plurality of first lifting hooks.

2. The transfer cask system of claim 1, wherein the cylindrical sleeve comprises a radiation shield designed to shield radiation generated from the spent nuclear fuel.

3. The transfer cask system of claim 1, wherein the cylindrical container further comprises a plurality of support tabs situated near the bottom of the cylindrical container, the cylindrical sleeve resting on the plurality of support tabs when disengaged with the lifting device.

4. The transfer cask system of claim 1, wherein the lifting device is configured to simultaneously lift the cylindrical container and the cylindrical sleeve.

5. The transfer cask system of claim 1, wherein the plurality of lifting members are uniformly disposed around the top of the cylindrical container.

6. The transfer cask system of claim 1, wherein the plurality of second lifting hooks comprise a plurality of hydraulic hooks that are configured to engage with and disengage from the cylindrical container.

7. The transfer cask system of claim 1, wherein the cylindrical sleeve is slidably removable from the cylindrical container.

8. The transfer cask system claim 1, wherein the plurality of trunnion pins are uniformly disposed around the cylindrical sleeve such that a first trunnion pin is opposite from a second trunnion pin.

9. The transfer cask system of claim 1, wherein the bottom of the cylindrical container further comprises doors designed to extend outwardly from the bottom of the cylindrical container to allow for transfer of the canister comprising the spent nuclear fuel from the cylindrical container to a storage container.

10. A system for transferring spent nuclear fuel from wet storage to dry storage, the system comprising:
- a container comprising a first set of attachment components and an opening configured to support a canister comprising spent nuclear fuel;
- a shielding sleeve configured to be disposed around an exterior of the container, the shielding sleeve comprising a second set of attachment components; and
- a lifting device comprising a first support assembly and a second support assembly, the first support assembly comprising a plurality of first plates extending outwardly along a longitudinal axis of the lifting device and a plurality of first lifting hooks coupled to ends of the plurality of first plates and extending downwardly from the first support assembly, the second support assembly being affixed perpendicular to the first support assembly, and the second support assembly comprising a second plate and a plurality of second lifting hooks uniformly disposed around a peripheral of the second plate, the lifting device configured to:
- attach to the container via the first set of attachment components and the plurality of first lifting hooks;
- attach to the shielding sleeve via the set of second attachment components and the plurality of second lifting hooks; and
- simultaneously lift the container and the shielding sleeve from a spent fuel pool when the container is submerged in the spent fuel pool.

11. The system of claim 10, wherein a total weight of the shielding sleeve and the container exceeds a weight limitation of a floor of the spent fuel pool, and wherein the lifting device is configured to lower the shielding sleeve into the spent fuel pool containing the container, the shielding sleeve remaining attached to the lifting device such that a weight of the shielding sleeve is not transferred to the floor of the spent fuel pool.

12. The system of claim 10, wherein the first set of attachment components extend upwardly from a top of the container.

13. The system of claim 10, wherein the second set of attachment components comprise a set of trunnion pins extending outwardly from an exterior wall of the shielding sleeve.

14. The system of claim 10, wherein a bottom of the container further comprises doors designed to extend outwardly from the bottom of the container to allow for transfer of the canister comprising the spent nuclear fuel from the container to a storage container.

15. The system of claim 10, wherein the shielding sleeve comprises a radiation shield designed to shield radiation generated from the spent nuclear fuel.

16. The transfer cask system of claim 1, wherein the top of the cylindrical container comprises a plurality of canister retainer tabs configured to attach the canister to the cylindrical container.

17. The system of claim 10, further comprising a plurality canister retainer tabs disposed along a top surface of the container, the canister retainer tabs being configured to secure the canister.

18. The system of claim 10, wherein the plurality of second lifting hooks comprise a plurality of hydraulic hooks that are configured to engage with and disengage from the set of second attachment components.

* * * * *